United States Patent
Van Den Berg

(10) Patent No.: US 8,646,410 B2
(45) Date of Patent: Feb. 11, 2014

(54) AUTOMATIC MILKING DEVICE

(75) Inventor: Karel Van Den Berg, Bleskensgraaf (NL)

(73) Assignee: Lely Patent N.V., Maassluis (NL)

( * ) Notice: Subject to any disclaimer, the term of this patent is extended or adjusted under 35 U.S.C. 154(b) by 153 days.

(21) Appl. No.: 13/015,610

(22) Filed: Jan. 28, 2011

(65) Prior Publication Data

US 2011/0114024 A1    May 19, 2011

Related U.S. Application Data

(63) Continuation of application No. PCT/NL2009/000156, filed on Jul. 27, 2009.

(30) Foreign Application Priority Data

Jul. 28, 2008 (NL) ...................................... 1035763

(51) Int. Cl.
*A01J 5/003* (2006.01)
*A01J 5/017* (2006.01)

(52) U.S. Cl.
USPC .................................... 119/14.02; 119/14.03

(58) Field of Classification Search
USPC ................. 119/14.02, 14.03, 14.18
See application file for complete search history.

(56) References Cited

U.S. PATENT DOCUMENTS

| | | | |
|---|---|---|---|
| 4,685,422 A | 8/1987 | Middel | |
| 5,918,566 A * | 7/1999 | van den Berg | 119/14.02 |
| 6,205,949 B1 * | 3/2001 | van den Berg | 119/14.02 |
| 6,213,051 B1 * | 4/2001 | Fransen | 119/14.08 |
| 7,044,079 B2 * | 5/2006 | Deelstra | 119/14.1 |
| 7,261,054 B2 | 8/2007 | Van Den Berg | |
| 2005/0076839 A1 | 4/2005 | Van Den Berg | |
| 2012/0298043 A1 * | 11/2012 | Birk et al. | 119/14.04 |

FOREIGN PATENT DOCUMENTS

| | | |
|---|---|---|
| EP | 1172032 A | 7/1997 |
| EP | 0786203 A | 1/2002 |
| WO | 9927771 A | 6/1999 |

OTHER PUBLICATIONS

WO2010014002 Search report and written opinion.

\* cited by examiner

*Primary Examiner* — Yvonne Abbott
(74) *Attorney, Agent, or Firm* — Hoyng Monegier LLP; Coraline J. Haitjema; David P. Owen

(57) ABSTRACT

A device for milking an animal, such as a cow, includes an animal standing area to be occupied by the animal to be milked in a particular milking position and a robot device with a robot arm assembly for applying to and/or removing teat cups from the respective teats of the udder of the animal. The robot arm assembly has a holder for teat cups at a distal end. At a proximal end, the robot arm assembly is suspended from a support so as to extend downwards therefrom and is rotatable with respect thereto about a first center line which has a vertical direction component, wherein, in use, the first center line intersects the floor of the animal standing area.

51 Claims, 9 Drawing Sheets

AUTOMATIC MILKING DEVICE

CROSS REFERENCE TO RELATED APPLICATIONS

This is a continuation of PCT application number PCT/NL2009/000156 filed on 27 Jul. 2009, which claims priority from NL application number 1035763 filed 28 Jul. 2008, the contents of both applications are hereby incorporated by reference in their entireties.

BACKGROUND OF THE INVENTION

1. Field of the Invention

The invention relates to an automatic milking device for animals, in particular hoofed animals, such as cows, and to a shed provided with such a device. The invention further relates to a method of milking animals by means of a robot.

2. Description of the Related Art

U.S. Pat. No. 6,205,949 discloses a device for milking goats, wherein the goats are standing on juxtaposed standing areas. At the rear side of the standing areas there is provided a rail construction along which a support with a robot arm assembly is movable. The robot arm assembly is provided at the distal end with a gripper for holding a teat cup and applying it to a teat. The robot arm assembly is rotatable about a horizontal centre line with respect to the support. The robot arm assembly is also provided with a telescopic element for extending or retaining same.

U.S. Pat. No. 4,685,422 shows a milking device with box and a milking robot supported therein. The milking robot carries, on an arm which is tillable about a horizontal centre line, a holder for teat cups. The arm is carried by a frame which is linearly movable between a position at some distance behind an animal to be milked and a position in which the holder holds the teat cups under the teats. The support construction with milk robot may be pivotably fastened to one of the vertical stands of the box.

EP patent 1,172,032 describes a milking device with a box and a robot arm assembly. The robot arm is suspended, by means of a ball hinge, from a support which is supported on a horizontal upper longitudinal girder of the box in order to be able to be moved therealong. The robot arm extends vertically downwards along the outside of the box and carries at the lower end, by means of a parallelogram rod system, inter alia a holder for teat cups which is vertically displaceable thereby.

BRIEF SUMMARY OF THE INVENTION

An object of the invention is to provide an automatic milking device which is able to perform in a fast manner an action on a teat of an animal which should be or has been milked.

An object of the invention is to provide an automatic milking device, provided with a robot arm assembly with a relatively low weight.

An object of the invention is to provide an automatic milking device, provided with a robot arm assembly whose end is manipulable in a reliable and/or fast manner.

An object of the invention is to provide an automatic milking device by means of which it is possible to perform in a fast manner actions on the udders/teats of animals which are arranged in a series.

At least one of these objects is achieved according to one aspect of the invention by implementation of a device for milking an animal, such as a cow, comprising an animal standing area to be occupied by the animal to be milked in a particular milking position and a robot device with a robot arm assembly for applying to and/or removing teat cups from respective teats of the udder of the animal, wherein the robot arm assembly at a distal end is provided with holding means, such as holders, for the teat cups, wherein the robot arm assembly at a proximal end is suspended from a support so as to extend downwards therefrom and is rotatable with respect thereto about a first centre line which has a vertical direction component, wherein, in use, the first centre line intersects the floor of the animal standing area.

This makes it possible that, for the entire robot arm assembly, the point of rotation for rotation about a centre line with vertical component, will be located close to the animal, in particular the parts thereof which are to be operated. During performing the actions on successive teats, the displacements can be kept limited. Owing to this, the process can be performed in a faster and more reliable manner.

It should be noted that by animal standing area is meant the space to be occupied by the animal to be milked during milking, including applying and removing teat cups and performing other actions, if desired, on the teats. Said (net) space for the animal may be confined by separating elements or, for example, be determined by the position of a feed trough with, if desired, short partitions on either side thereof.

In particular, the first centre line intersects the floor of the animal standing area at a place situated in the vertical projection of the animal on the floor in the position occupied by said animal at that moment.

It should be noted that NL 1008330 which is hereby incorporated by reference in its entirety, discloses a milking device which is provided with an inverted U-shaped frame suspended by chains from a carriage. To at least one of the two hanging legs of the U-shaped frame there is mounted a milking unit which forms a support for a robot arm assembly, at the proximal end thereof. At the distal end the robot arm assembly is provided with equipment and at the proximal end the robot arm assembly is rotatable about a main pivoting point with respect to the support. The frame is provided with contact plates for contact with both sides of a cow to be milked. By means of the contact plates the frame follows directly the movements of the cow, the chain suspension enabling the movement of the frame. The milking unit, and thus the support for the robot arm assembly, moves along with the frame, so that the support with the main pivoting point for the robot arm assembly is always beside the cow.

EP 0,786,203 which is hereby incorporated by reference in its entirety, discloses an implement comprising a milking device, in which at its proximal end a robot arm assembly is rotatable about a vertical centre line which, in vertical projection, coincides with a constructional part of the lateral boundary of an animal standing area and, consequently, is located outside the latter.

In an embodiment according to the invention, if the animal standing area, which is usually elongate, comprises a rear region which, in use, is intended for the region beginning with the navel of the animal and the animal part located therebehind, the robot arm assembly may have an end arm portion which comprises the distal end, wherein the first centre line intersects the end arm portion at a place above the rear region.

In another embodiment of the present invention, in which the rear region has a rear part for the hind legs and (in vertical projection) the udder region of the animal, the first centre line can intersect the end arm portion at a place above the rear part of the rear region. Said rear part is determined by the floor surface which is intended for the hind legs and by the floor surface located in front thereof and adjacent thereto which is situated straight (vertical projection) below the possible location of the udder region. The required pivoting movement can thus be limited further.

In another embodiment, in which the rear part of the rear region has a hind leg part which is intended for the hind legs of the animal, the first centre line can intersect the end arm portion at a place above the hind leg part of the rear part of the rear region. In still another refined embodiment, the first centre line intersects the end arm portion at a place between the hind legs.

In an embodiment of the device according to the invention, the first centre line can intersect the end arm portion in a region under the animal, preferably in a region located between the rear side of the hind legs and the front teats, preferably in a region located between the rear side of the hind legs and the rear teats of the udder of the animal, preferably at a place between the two hind legs.

In this case, use can advantageously be made of the fact that the front teats of a cow are at a greater mutual distance from each other than the rear teats, so that the teats are situated at the corners of an imaginary trapezium, the oblique sides of which converge rearwards.

Said arrangements are especially advantageous for application in so-called rear milkers (see also the aforementioned U.S. Pat. Nos. 6,205,949 and 4,685,422 which are hereby incorporated by reference in their entireties), in which the equipment is supplied from the rear side, between the hind legs. This makes it possible to achieve a very short radius of the pivoting curve to be made by the equipment.

The position of the support for the robot arm assembly can (otherwise than in NL 1008330) always be entirely constructively determined, also during treatment of an animal, such as stationary on a frame, or movable on a carriage, which carriage has in that case a positively adjustable position on a frame. During use, the position can always be controlled independently of the position of the animal, in particular in a contactless manner, i.e. clear of the animal.

In a further embodiment, the first centre line is located, in use, in a vertical plane which is parallel to a vertical central longitudinal plane of the animal standing area.

The support itself will be supported on a frame of the device. In an embodiment, the support is then located at a distance above the floor of the animal standing area, which distance is greater than the height of the teats of the animal to be milked.

If said distance is greater than the height of the animal to be milked, it is achieved that the support is located outside/above the movement profile of the animal, but that the first centre line of rotation for the robot arm assembly intersects the floor of the animal standing area.

In an embodiment, the first centre line makes an angle of less than 30 degrees with the vertical, and preferably extends substantially vertically.

In order to promote the manipulation of the equipment, in an embodiment of the robot arm assembly, the proximal end is rotatable about a substantially horizontal second centre line which is transverse, preferably perpendicular, to the first centre line. In this case, the robot arm assembly is rotatable at the proximal end both about the first and the second centre line.

In order to function as a rear milker, the device may be provided with mechanisms for holding equipment, in particular the aforementioned end arm portion, extend from the rear side to under the animal.

In this context, according to another aspect of the invention, at least one of the aforementioned objects is achieved by a device for milking an animal, such as a cow, comprising an elongate animal standing area, with a rear end and a front end, for bringing the animal to be milked into a particular milking position and a robot device with a robot arm assembly for performing actions on the teats of the animal to be milked, wherein the robot arm assembly at a distal end is provided with means for holding equipment with which the relevant action is to be performed, wherein the robot arm assembly at a proximal end is suspended from a support and is rotatable with respect thereto about a first centre line which has a vertical direction component, as well as about a substantially horizontal second centre line which is transverse, preferably perpendicular, to the first centre line, further provided with drive means, for bringing the holding means, such as a holder, at the rear end, between the hind legs of an animal standing in the animal standing area, to near the udder. In a further embodiment thereof, as set out in the foregoing, the first centre line intersects the floor of the animal standing area.

Also here, the position of the support for the robot arm assembly can be entirely constructively determined, such as stationary on a frame, or movable on a carriage, which carriage has in that case a positively adjustable position on a frame.

It should be noted that US 2005/0076839, which is hereby incorporated by reference in its entirety, shows a self-propelled carriage which is provided with two brushes which are rotatable about their own horizontal centre lines, and which are together supported on a holder which is itself rotatable about a vertical centre line.

In all embodiments, the support may be provided with first drive means for rotating the robot arm assembly about the first centre line. In the case of possible rotation about the aforementioned second centre line, the support may likewise be provided with second drive means for rotating the robot arm assembly about the second centre line. The first and second drive means comprise a first and a second drive, respectively, in the support.

In this case, the robot arm assembly may be of a light construction, so that the speed of the movements to be performed can be increased.

The holding means may be designed in various manners, depending on the actions to be carried out. They are able to hold the equipment in a permanent manner or to form grippers or supports and the like for equipment which is kept standby by a device in order to be moved to the teats and, if desired, to be moved back, by the holding means of said device.

In an embodiment in which the holding means are configured to apply to and/or to remove teat cups from respective teats of the udder of the animal, the holding means are configured to hold teat cups and are provided at the distal end of the robot arm assembly.

In an embodiment thereof, the teat cups are configured for cleaning and/or disinfecting the teats prior to the milking and/or following the milking. In another embodiment thereof, the teat cups are configured for foremilking. In still another embodiment thereof, the teat cups are configured for milking.

In an embodiment, the device is further provided with a separate carrier for teat cups, wherein the holding means at the distal end of the robot arm assembly are configured to take the teat cups from the carrier and to put the teat cups back on the carrier.

In an alternative embodiment, the holding means are configured to hold means for cleaning the teats and/or the udder.

In an alternative embodiment, the holding means are configured to hold means for stimulating the teats.

In an alternative embodiment, the holding means are configured to hold means for inspecting the milk quality.

To promote the adaptation to the actual height position of the teats, the robot arm assembly, at a place between the distal end and the proximal end, may be provided with a pivot with a substantially horizontal centre line, wherein the drive for third drive means for the movement about said pivot is preferably mounted in the support.

The device according to the invention may be multiple, for example provided with a series of juxtaposed animal standing areas, wherein the series is straight, or circumferential, like in a carrousel.

The device according to the invention may be provided with a plurality of robot arm assemblies which are configured and may be controlled for performing different actions. One robot arm assembly may, for example, be intended for cleaning the teats and the other robot arm assembly may be intended for applying teat cups prior to the milking. Owing to the aforementioned light construction, the robot arm assemblies occupy little volume and are quickly displaceable.

At least one of the aforementioned objects is achieved, according to another aspect of the invention, by a method of performing a milking related action on the teats of an animal standing in an animal standing area, wherein the action is performed by means of equipment which is mounted on a distal end of a robot arm assembly and which is passed from behind between the hind legs of the animal to near the teats, while extending with a horizontal direction component, whereafter the actions are performed in succession for at least two teats while pivoting the robot arm assembly with equipment about a first centre line with a vertical direction component which intersects the floor of the animal standing area. A post-milking process is thus performed in a quick and efficient manner. After the actions have been performed, the equipment can again be withdrawn between the legs.

In the aforementioned U.S. Pat. No. 4,685,422, in the post-milking process, a holder with four teat cups is held under the udder, in which case the holder is equipped with means for adjusting in horizontal direction the position of the teat cups with respect to the holder. Owing to this, the holder is relatively heavy and not quickly displaceable.

It should be noted that from U.S. Pat. No. 7,261,054, which is hereby incorporated by reference in its entirety, a carrousel arrangement is known, in which a robot carriage is movable over a fixed path at a distance from the rear side of a series of animal standing areas, and is provided with a robot arm having at its end a gripper for one teat cup. The teat cups are kept standby on the robot arm outside the path of the robot carriage. For every teat cup the robot arm should perform a displacement from carrier to teat and vice versa.

In another embodiment, the actions are performed in succession for two front teats. In yet another embodiment, the actions are performed in succession for two rear teats. The position of both front teats with respect to the rear side and with respect to the floor is comparable. The same holds for the rear teats. The successive actions can thus be performed with a limited number of movements of the equipment.

In a further development thereof, the actions are performed in succession for all the teats.

In the post-milking process according to the invention, use can be made of the further embodiments in the suspension of the robot arm assembly described in the foregoing, in particular in relation to the region of the animal standing area where the first centre line intersects the mentioned end arm portion. In a favourable embodiment, the first centre line intersects the end arm portion in a region under the animal, preferably in a region located between the rear side of the hind legs and the front teats, preferably in a region located between the rear side of the hind legs and the rear teats of the udder of the animal, preferably at a place between the hind legs.

During the actions, the robot arm assembly is preferably held in such a manner that the first centre line coincides with a vertical central longitudinal plane of the animal.

In a first further embodiment, during performing the actions with the equipment, the robot arm assembly is downwardly suspended from a support.

In a second further embodiment, during performing the actions with the equipment, the robot arm assembly extends with a horizontal direction component from a support which is directly supported on a ground, wherein the equipment is rotatable about the first centre line in the region of a pivot which is held below the trunk of the animal. The support may be formed by a self-propelled carriage which is preferably freely movable.

According to what has already be pointed out above, the nature of the actions to be performed may be diverse, such as applying to and/or removing teat cups from respective teats of the udder of the animal, cleaning and/or disinfecting the teats prior to the milking and/or following the milking, the foremilking, the milking, the stimulation of the teats.

The milking process can be performed quickly if successive sorts of actions are each performed with a separate robot arm assembly equipped accordingly. The light construction of the relevant robot arm assemblies is advantageous in this case. This is also the case if a series of animals have to be milked in direct succession, such as on a series of animal standing areas driven in rotation, such as a carrousel. During the performance of the actions, the robot arm assemblies are able to move together with the relevant animal standing area.

In yet a further embodiment of the present invention, the invention provides a method of performing a milking related action on the teats of an animal standing in an animal standing area, wherein the action is performed with equipment which is mounted on an arm assembly of a robot, which robot arm assembly is suspended from a support and extends downwards therefrom, wherein the position of the support is always mechanically controlled, wherein the actions are performed while pivoting the robot arm assembly with respect to the support about a first centre line which intersects the floor of the animal standing area. During pivoting for performing the aforementioned actions, the first centre line preferably intersects the floor of the animal standing area at a place situated in the momentary vertical projection of the animal on the floor. The above-mentioned embodiments of the device according to the invention and the method steps can also be applied in this method.

According to further aspects of the present invention, the invention provides a method of performing a milking related action on the teats of an animal standing in an animal standing area, wherein the action is performed with equipment which is mounted on a robot arm, wherein the actions are performed in succession for at least two teats while pivoting the arm with the equipment, the arm extending with a horizontal direction component, about a first centre line with a vertical direction component which intersects the robot arm at a place above the part of the floor of the standing area that is intended to be positioned below the udders or under or between the hind legs of the animal. In an embodiment, the robot arm is passed from behind between the hind legs of the animal to near the teats, whereafter the actions are performed in succession for at least two teats while pivoting the arm with the equipment about the first centre line.

At least one of the aforementioned objects is achieved, according to another aspect of the invention, by means of a carriage provided with a drive and a control unit for freely moving the carriage over a ground, wherein the carriage is provided with an arm extending with a horizontal direction component with means for holding equipment for performing an action on the teats of an animal which is to be milked or has been milked in an animal standing area, wherein the holding means are mounted on a distal end portion of the arm, wherein the end portion is connected to the rest of the arm by means of a pivot, wherein the pivot has a pivot axis with a vertical direction component. Such a carriage is particularly suitable for performing the aforementioned methods. The arm can have a substantially horizontal orientation.

It should be noted that in U.S. Pat. No. 7,261,054, which is hereby incorporated by reference in its entirety, a carrousel arrangement is known, in which freely movable, self-propelled robot carriages are used, which are provided with a liftable robot arm which is provided at its end with a holder for a teat cup. The arm is not pivotable about a vertical centre line.

In a further, simple embodiment of the carriage according to the invention, the arm is retained at its proximal end against rotation about a vertical centre line.

In a further embodiment, comprising a chassis, when viewed in vertical projection on a horizontal plane, the pivot is located outside the chassis.

Passing between the hind legs from behind is facilitated if there is used a holder for teat cups, comprising a movable arm which is provided at its end with a carrier with receivers for at least two, in one embodiment four, teat cups, wherein the arm has a principal direction and all the receivers are located behind each other according to one line coinciding with or parallel to the principal direction, wherein, in a projection on a plane perpendicular to the principal direction, they coincide at least partly, preferably for more than half, or completely. Such a holder can advantageously be used in a device and/or carriage according to the invention, and when performing a method according to the invention.

In order to accelerate applying to and removing teat cups from an animal to be minced/treated, the invention, according to another aspect, provides an assembly of two teat cups and a discharge line for discharge of liquid from the two teat cups, wherein the discharge line connects to the two teat cups via a Y-line section.

In this case, the diameter of the discharge line can be kept limited if the pressure means for moving liners in the teat cups in a pulsating manner are configured for having the liners contract/widen within the assembly in an alternating manner. In this case, the milk discharges of the two cups can succeed each other.

There may then be provided flow meters in both arms of the Y-line section or the teat cups, and a control unit which is configured for controlling the pressure means in order to have the alternating control of the liners take place above a particular measured flow. Alternation can thus be started when the milk flow from both connected teats has properly started.

The aspects and features described in this description and the claims of the application and/or shown in the figures of this application may, where possible, also be used separately from each other. Those separate aspects, such as the position and direction of the centre line of rotation for the robot arm, the self-propelled carriage and the teat cup assembly, and other aspects, may be the subject of split patent applications aimed at them. This holds in particular for the features and aspects which are described per se in the dependent claims.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1A:
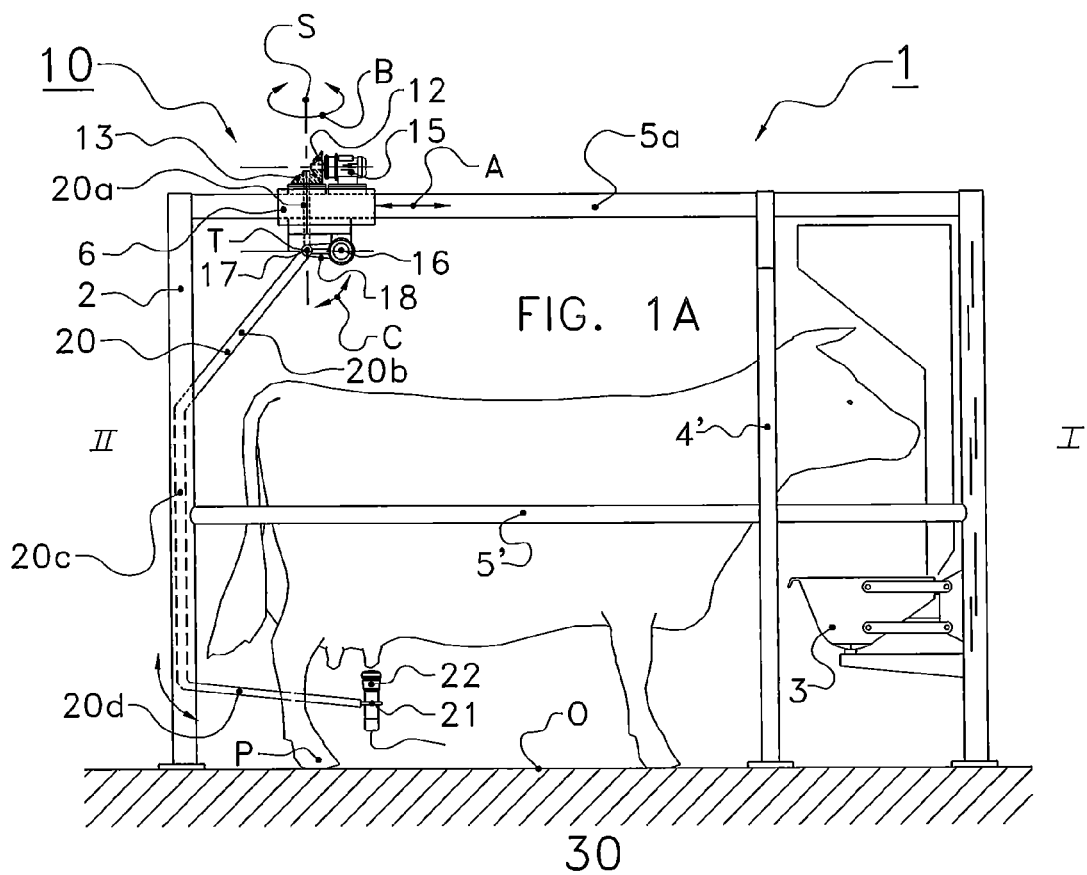
FIGS. 1A-C are a schematic side view and top view of a first exemplary embodiment of a milking device according to the invention, as well as an operational detail.
Figure 1B:
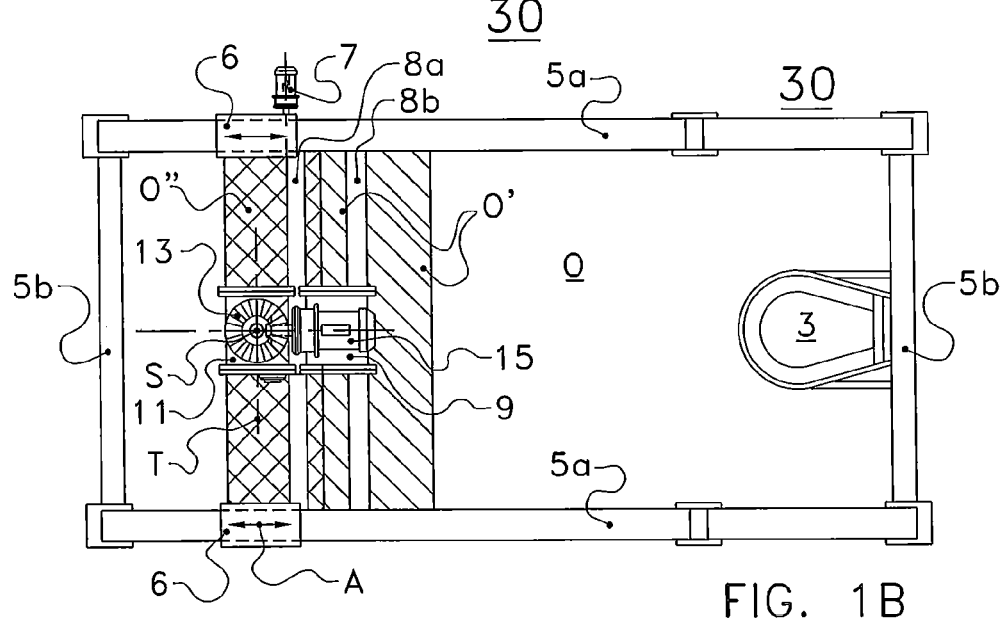
Figure 1C:
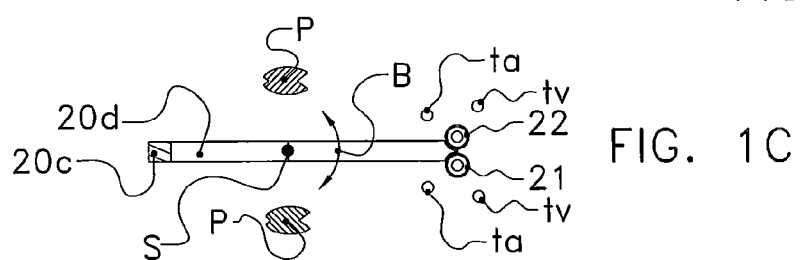

The following is a description of certain embodiments of the invention, given by way of example only and with reference to the drawings. Referring to FIG. 1, The milking device 1 of FIGS. 1A-C comprises a frame 2 which is placed on a floor 30. The frame 2 comprises stands 4, upper longitudinal girders 5a and upper cross beams 5b, as well as lateral separation bars 4' and 5'. A feed trough is mounted at the eating side I. The rear side II is open for passage of a cow. The frame 2 surrounds an animal standing area O which, in the top view of FIG. 1B, is located within the vertical projection of the parts of the frame 2 on the floor 30.

A robot device 10 is supported on the girders 5a by means of slides 6, and is provided with a motor 7 for moving in the longitudinal direction A.

The slides 6 are interconnected by crossbeams 8a,b on which a—in this example plate-shaped—support 9 is fastened. The support plate 9 carries a motor 15 which drives a conical gear 11 which forms a right-angled transmission with a conical gear 12 which is bearing-supported on the support plate 9, the gear 12 rotating about a (first) centre line S in the directions B. The gear 12 is rotationally fixed with an upper end portion 20a of a robot arm assembly 20, which upper end portion 20a comprises the proximal end of the robot arm assembly 20 and extends vertically through a borehole 13 in the support plate 9. In this example, the centre line S extends vertically. Moreover, in this example, the centre line S is located in the middle between the girders 5a. At the lower side of the support plate 9 there is fastened a motor 16 which drives a chain 18. In the region of a pivot 17 provided with a horizontal (second) centre line of rotation T, the upper end portion 20a of the robot arm assembly 20 merges into arm portion 20b. The rotational position of arm portion 20b with respect to arm portion 20a can be adjusted in the directions C about centre line T by means of the motor 16 and the chain 18, which engages a rigid arm portion 20b.

The arm portion 20b merges, at its lower end via a rigid angle, into a rigid arm portion 20c which merges itself, at its lower end via a rigid angle, into a rigid arm end portion 20d. At its distal end, the arm end portion 20d carries a double gripper 21, which is operable in a not further described manner, for two teat cups 22 which are able of being gripped, held and supplied/positioned thereby. It is possible for the teat cups to be held standby for the gripper on a non-shown holder and then to be removed therefrom two by two.

A non-shown programmable control unit controls the motors 7,15,16, as well as other non-shown components, partly on the basis of data from position and/or angle sensors for the robot device and components thereof and for the animal.

The dimensions of the frame 2 are, as is customary, attuned to the biggest animal to be milked, for an FH cow with nose to tail length of 265 cm, largest width of 60 cm and shoulder height of 150 cm, for example an internal length of 300 cm, an internal width of 125 cm and an internal height of 180 cm.

When the cow has been arranged in the standing area O in order to be able to eat, it is possible to distinguish, in the standing area O, a rear region O' which (viewed in vertical projection) begins straight under the navel and extends rearwards to straight under the tail, and transversely until the edge of the standing area O. Within the rear region O' can be distinguished a rear part O" (double shaded) thereof, which begins straight under the front side of the udders and extends rearwards to straight under the tail, and transversely until the edge of the standing area O. Within the rear region O' falls a region which is intended for the hind legs P of the animal. Within the latter region falls a region which is located between the hind legs and, consequently, is smaller in width. FIG. 1B further shows a central longitudinal plane M which relates to the cow which, for the sake of clarity, has been omitted. It will be understood that the central longitudinal plane M moves together with the cow.

During operation, after a cow has entered the standing area O in the position of FIG. 1A, the robot device 10 is positioned, by operating the motor 7, in such a manner that the robot device 10 will occupy the position shown in FIGS. 1A,B. Here, the cow is assumed to stand in the middle, so at the central longitudinal plane M contains, at least substantially, the centre line S. By operating the motors 15 and 16, it is possible for the robot arm assembly 20 to be operated in such a manner that the gripper 21 will grip two teat cups from a non-shown holder (which is, for example, brought to under the navel, also by means of a robot arm). By operating the motors 15,16, the gripper is then moved in such a manner that one of the teat cups 22 will be positioned under one of the teats, and is subsequently moved in such a manner that the teat cup will be positioned. It is then possible to connect the second teat cup 22, for which purpose the robot arm assembly 20 only has to undergo a short displacement, wherein rotation in the horizontal plane occurs about centre line S, see also FIG. 1C, in which the teats are denoted by ta (hind teats) and tv (front teats). After the first two teat cups 22 have been positioned, the gripper is moved in order to take the next two teat cups from the aforementioned holder, and a comparable process takes place.

Figure 2A:
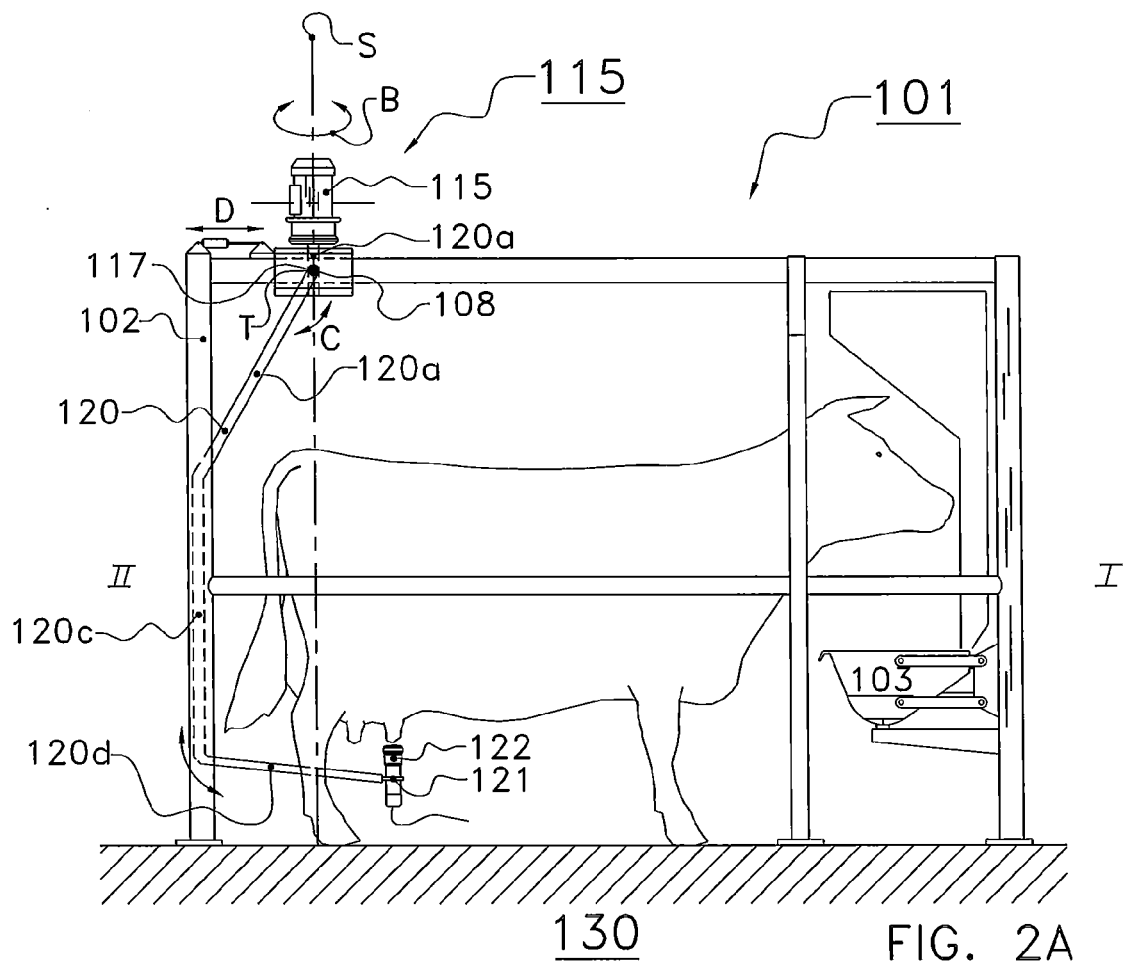
FIGS. 2A and 2B are a schematic side view and top view of a second exemplary embodiment of a milking device according to the invention.
Figure 2B:
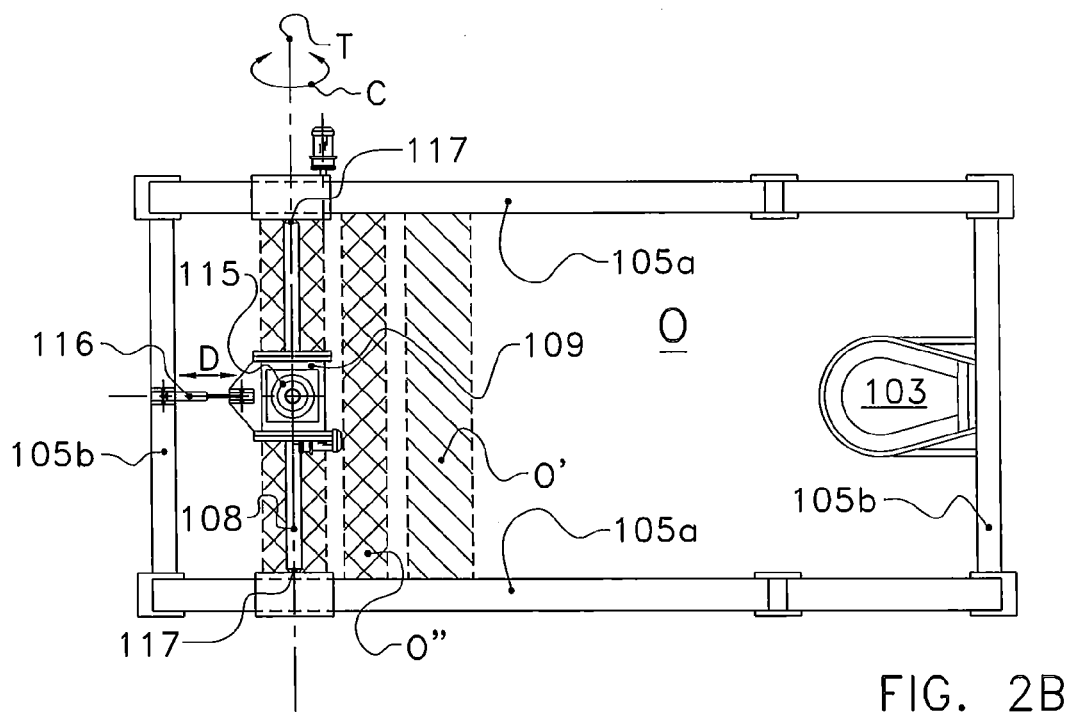

In FIGS. 2A and 2B too, there is a milking box-like arrangement of a milking device 101. Comparable components are denoted by the same reference numerals, increased by 100. In this case, however, the suspension of the robot arm assembly 120 is somewhat different. The slides 106 are interconnected by a cross-bar 108 which, in the region of bearings 117, is rotatable about the centre line T with respect to the slides 106. An—in this example plate-shaped—support 109 is rigidly fastened on the rod 108. The support plate 109 supports a motor 115 whose outgoing shaft is coaxial and rotationally fixed with the proximal end of the robot arm assembly 120, at the upper end of upper end portion 120a of the robot arm assembly 120. The upper end portion 120a merges, via a rigid angle, into a rigid portion 120b which, via a rigid angle, merges into a rigid arm portion 120c which, via a rigid angle, merges into a rigid arm end portion 120d, so that a substantially rigid robot arm assembly is achieved.

For rotation about the centre line T, the support plate 109 is movable by a cylinder 116 which is operable by the control unit and the fixed end of which is rotatably attached on the transverse carrier 105b. By extending/retracting the piston rod of the cylinder 116, it is possible for the support plate 109 to be rotated about the centre line T, and together therewith the robot arm assembly 120.

Also in this case, during operation, the gripper 121 is manipulated by proper control of the robot arm assembly by the control unit to grip the teat cups 122 and to position them.

Figure 3A:
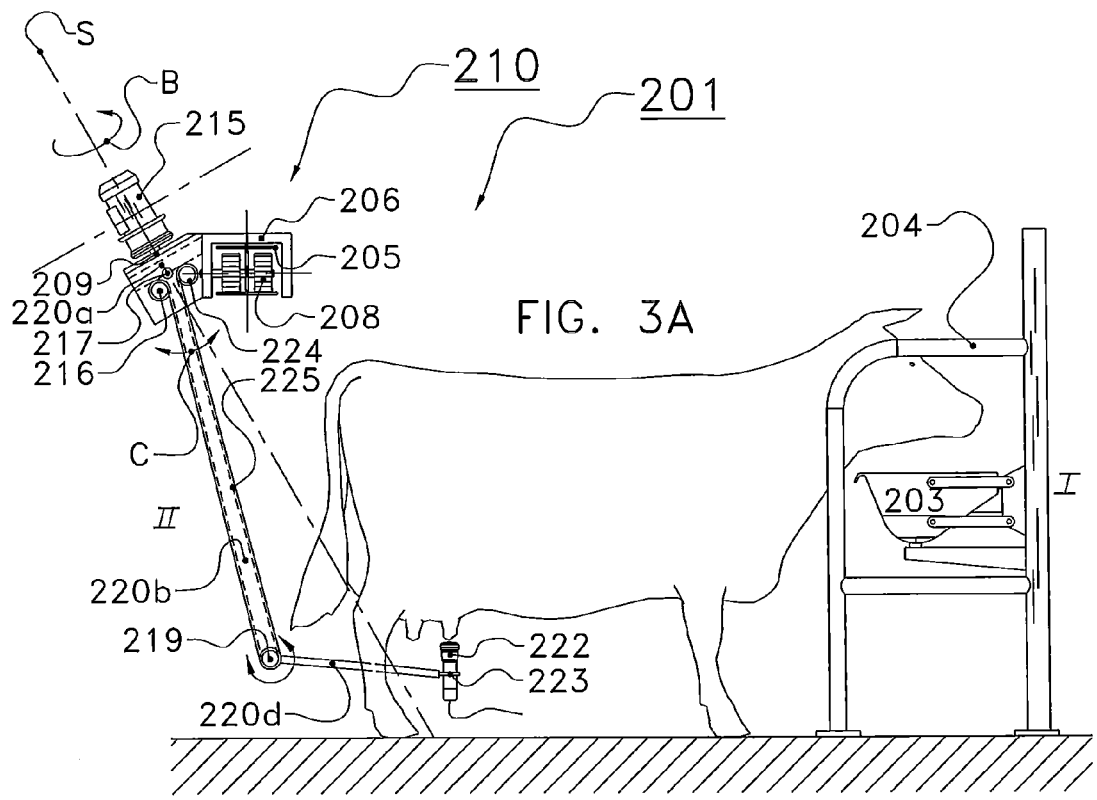
FIGS. 3A and 3B are a schematic side view and top view of a third exemplary exemplary embodiment of a milking device according to the invention.
Figure 3B:
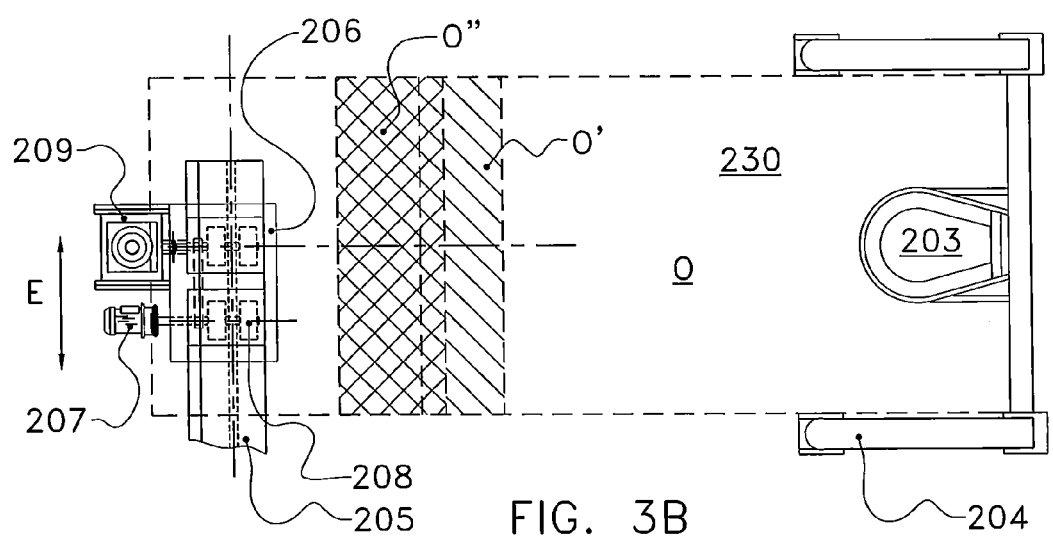

FIGS. 3A and 3B illustrate a rather open milking device. The standing area O is determined by the position of the lateral separating elements 204, which are located on both sides of the feed trough 203. The boundaries of the standing area O are indicated by a dashed line. Also here, the aforementioned sub-areas O', O" etc. can be distinguished.

Here, the robot device 210 is suspended from an I-section transverse rail 205. The robot device 210 comprises a slide 206 which, by wheels 208, engages the I-section 205, at least one set of wheels being driven by a motor 207 which is fastened on the slide 206 so that the robot device 210 is movable along the rail 205 in directions E. An—in this example plate-shaped—support 209 is rigidly fastened to the slide 206 and carries a motor 215, the outgoing shaft of which is coaxial and rotationally fixed with the proximal end of the robot arm assembly located on the upper end portion 220a of the robot arm assembly 220. The upper end portion 220a merges, via a pivot 217, into a rigid portion 220b which, via a pivot 219, merges into rigid arm end portion 220d. For mutual rotation of the arm portions about pivot 217, about horizontal centre line T, there is provided a motor 216 which is fastened against the lower side of the support plate 209 and drives a chain 218 which ensures rotation of arm portion 220b about centre line T. For mutual rotation of the arm portions 220b and 220d about pivot 219, about a centre line parallel to horizontal centre line T, there is provided a motor 224 which is fastened against the lower side of support plate 209 and drives a chain 225 which ensures rotation of arm portion 220d about centre line T. In this embodiment, the rotation in the vertical plane of arm portion 220b can be kept limited, if required, because the desired displacement of the gripper 221 can then be achieved by rotation of arm portion 220d.

In this example, the rail 205 may form an obstacle for the cow. Therefore, the rail 205 ends at some distance from the longitudinal edge of the standing area, so that there will be sufficient space left for access and exit of the animal. By operating the motor 207, the robot arm assembly 210 and the centre line S can be brought in the central longitudinal plane of the cow when the latter is somewhat obliquely positioned in the standing area O.

In the embodiment of FIGS. 4A and 4B, the again I-section rail 305 is positioned above the cow's profile in the standing area O, and is continuous here. The robot device 310 is also here a slide 306 which, by wheels 308 driven by motor 307, is movable in the directions E along the rail 305. An—in this example plate-shaped—support 309 is rigidly fastened to the slide 306 and carries a motor 315, the outgoing shaft of which carries a worm 312, which worm is in worm engagement with a worm wheel 313 which is rotatably supported on the support plate 309. The worm wheel 313 is rotationally fixed with the proximal end of the robot arm assembly 320, in this case with an upper end portion 320a of the robot arm assembly 320, which upper end portion extends upwardly through the support plate 309. The upper end portion 320a merges, via a pivot 317, into rigid arm portion 220b which, via a rigid angle, merges into rigid arm portion 220c which, via a rigid angle, merges into stiff arm end portion 320d. A motor 316 is fastened against the lower side of support plate 309 and drives a chain 318 which ensures rotation of arm portion 320b about pivot 317, about centre line T.

Figure 4A:
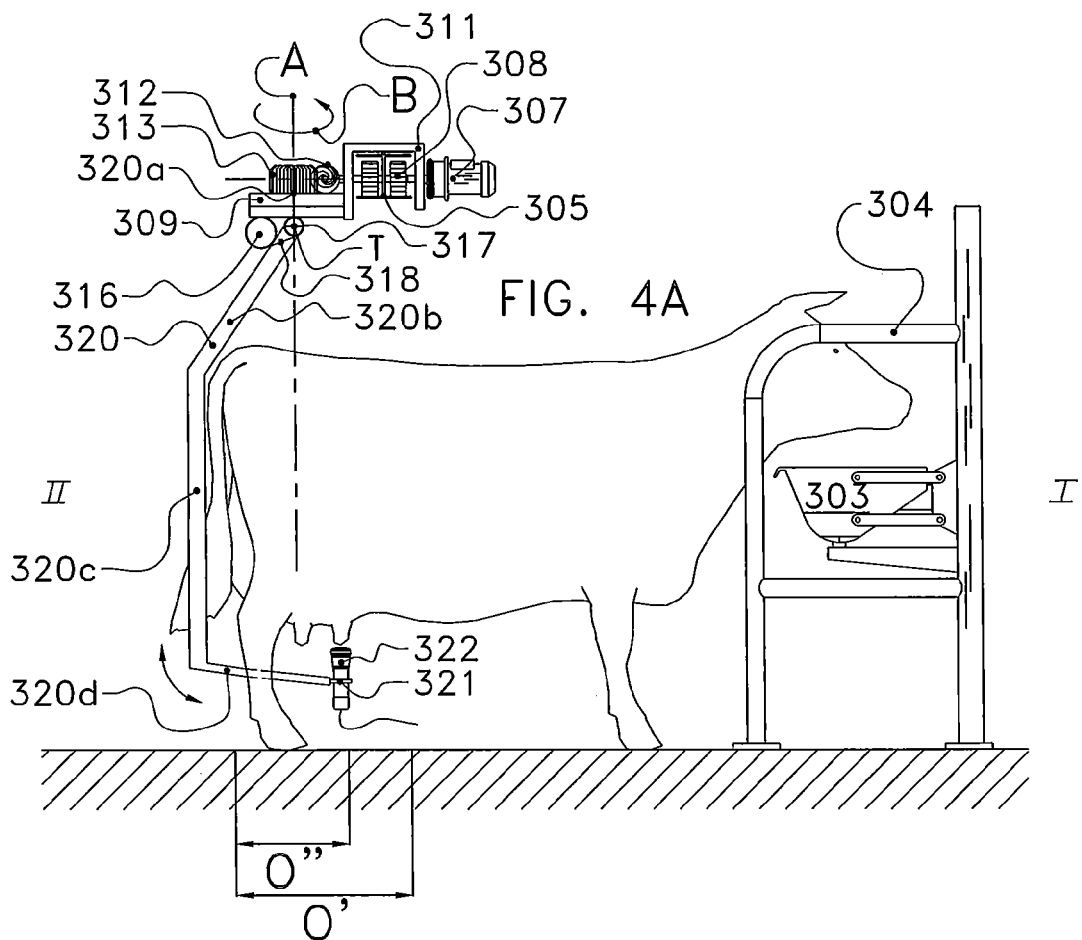
FIGS. 4A and 4B are a schematic side view and top view of a third exemplary exemplary embodiment of a milking device according to the invention.
Figure 4B:
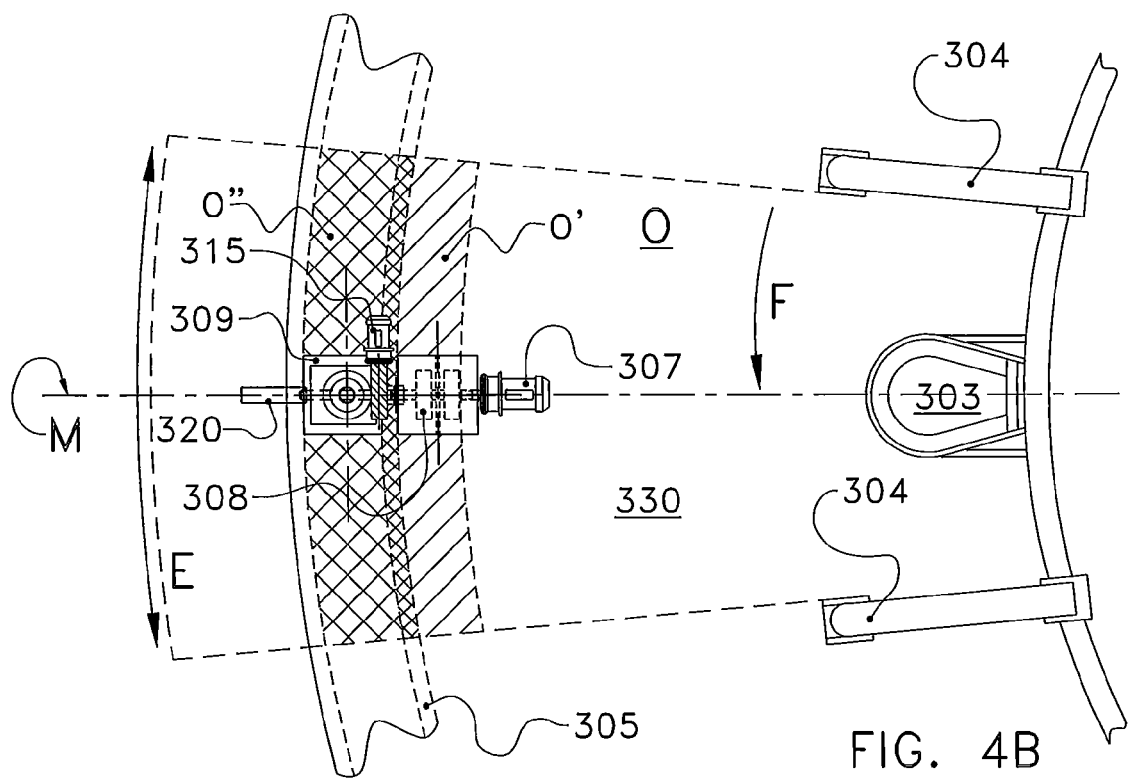

The embodiment of FIGS. 4A and 4B is inter alia suitable for application in carrousel arrangements, in which a series of juxtaposed standing areas are provided on a rotating platform 330, see arrow F in FIG. 4B. Here, the standing area O is laterally bounded by dashed lines which are contiguous to the inner lines of the separating elements 304 and are located in a radial plane with respect to the centre of rotation of the platform 330. In this case, the rear boundary of standing area O is indicated too, which, as above, is related to the relevant animal, i.e. taking into account the dimensions of the animal to be treated and the freedom of movement required by the animal during its stay in the standing area. A possible, also circumferential, passageway at the outer circumference of the platform is not taken into consideration.

Figure 5:
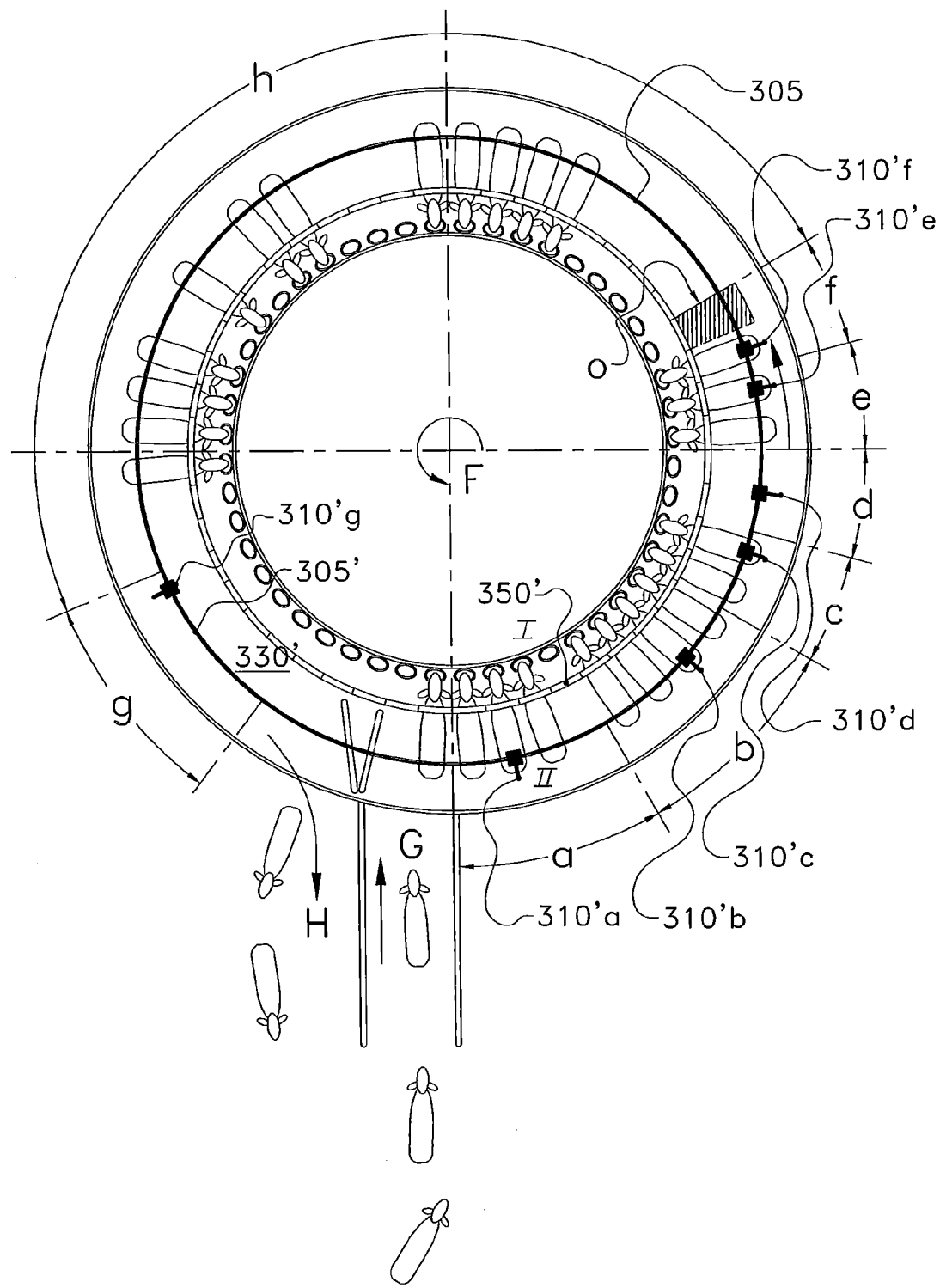
FIG. 5 is a top view of a carrousel-shaped milking device provided with a number of milking devices according to FIGS. 4A and 4B.

FIG. 5 is a schematic view of an example of such a carrousel arrangement, on which some dozens of standing areas O are provided. A circumferential series of feed troughs 303' is surrounded by a circumferential feed fence 350', as a result of which the standing areas O are determinable. One of the standing areas O is shown in shaded lines. At the radial outside thereof, region C forms a passageway which can be used in the access section G and the exit section H. The high positioning of the rail 305' enables quick entering and leaving.

The robot device 310 can be used for various different actions which have to be performed on the carrousel in relation to milking, adjusted to that function. For each action separate robot devices 310'a-g can be used, each having a respective working section during the rotation. In working section a the robot device 310'a is used for applying pre-dip cups to the teats of the cow. These may fall loose from the teat at the end of the treatment and be retracted by means of a cord to a cleaning/storage place provided under the cow, where they can be picked up by a gripper provided on the robot arm assembly. In working sections b and c robot devices 310'b and 310'c are used successively for cleaning the front teats and rear teats, respectively, of the cow. This is, for example, possible by means of a pair of rotating brushes mounted on the distal end of the relevant robot arm assembly. In working section d the robot device 310'd is used for stimulating the udders/teats. For this purpose there may be used cups by means of which it is also possible to collect and discharge foremilk. In working sections e and f robot devices 310'e and 310'f are used successively for applying teat cups to the front teats and rear teats, respectively, of the cow. The milking proper takes place in working section h, for approximately half a rotation. In working section g robot device 310'g is used for post-cleaning (after-dip) of the teats, in a manner according to the pre-dip.

The robot devices 310'a-g are all movable in a reciprocating manner over the rail 305', within the relevant working sections.

The time required for the actions to be performed by the robot devices is limited owing to the fact that the robot arm assemblies can be kept rather light in weight, because the drive means are supported on the frame, in particular the slides.

Figure 6A:
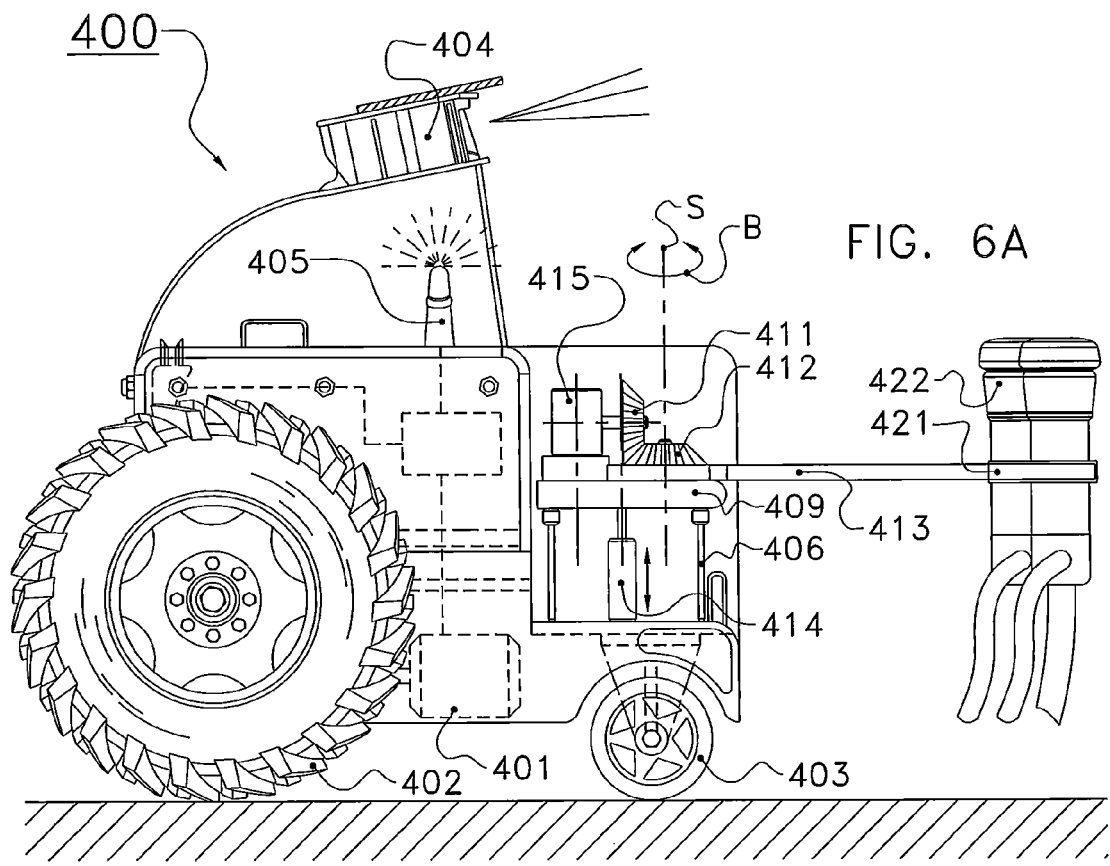
FIGS. 6A and 6B are a first exemplary embodiment of a carriage for use in a milking device according to the invention.
Figure 6B:
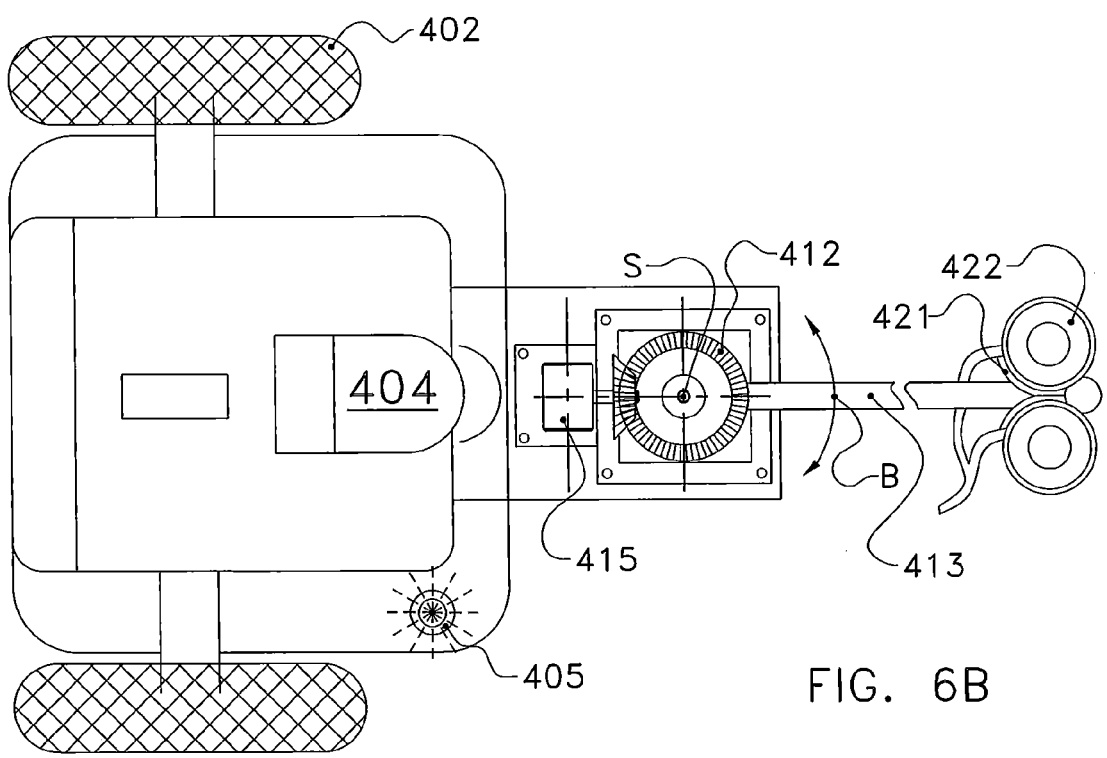

FIGS. 6A and 6B illustrate an exemplary embodiment of a self-propelled robot carriage 400, i.e. a robot carriage which is provided with its own drive means. The carriage 400 comprises a chassis 401 which is carried by wheels 402 and 403. The wheels 402 are each driven separately, in two directions, by a motor provided on the carriage 400, so that its manoeuvrability is optimal. Wheel 403, however, may be a freely rotating castor wheel. The carriage 403 is further provided with a control unit which, via transmitter/receiver 405, communicates with a central control unit of a milking device.

By means of a position determining device 404 it is possible to determine the position of the teat of a cow, on the basis of which data the central control unit is able to control the carriage to perform the desired actions. In this example, this is attaching teat cups 422 which are held by a gripper 421 which is mounted on the distal end of an arm 413 which forms at the proximal end a rotatable unit with conical gear wheel 412, with vertical centre line of rotation S. Gearwheel 412 forms a right-angled transmission with conical gearwheel 411 which can be driven in two directions by motor 415. The motor 415 is carried by a support plate 409 which is upwardly and downwardly movable by cylinder 414 along vertical guide means 406. Conical gearwheel 412 and arm 413 are rotatably bearing-supported on support table 409.

Figure 7A:
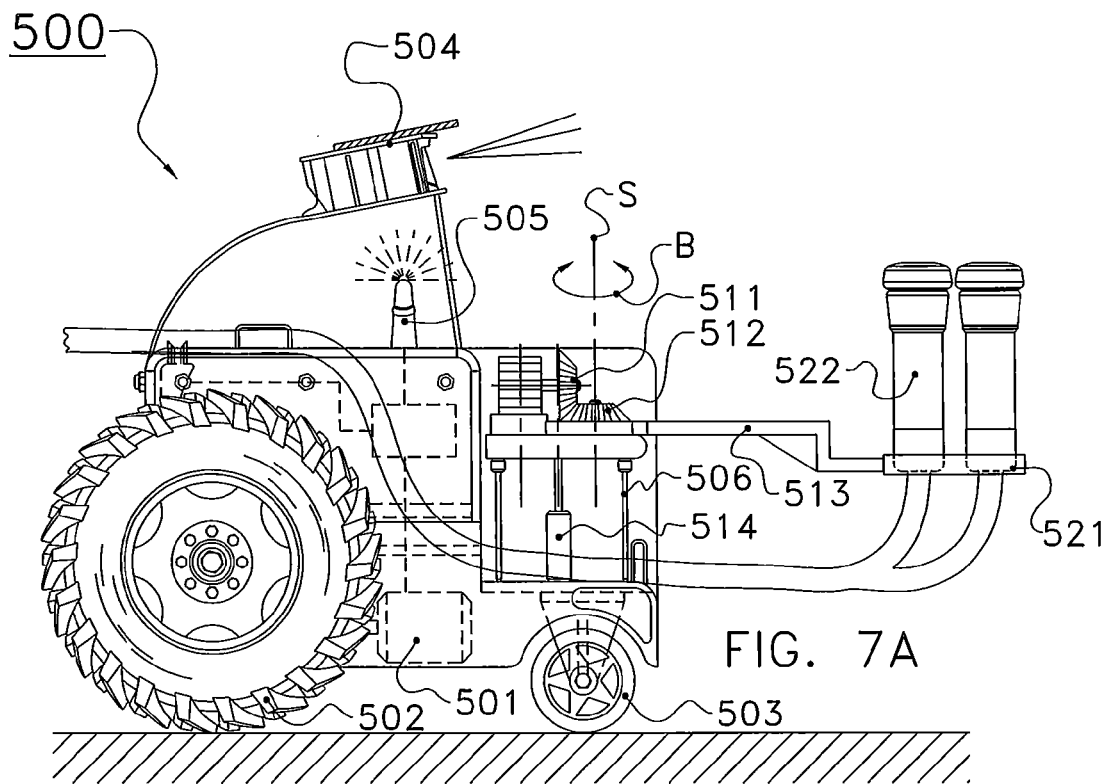
FIGS. 7A and 7B are a first exemplary embodiment of a carriage for use in a milking device according to the invention.
Figure 7B:
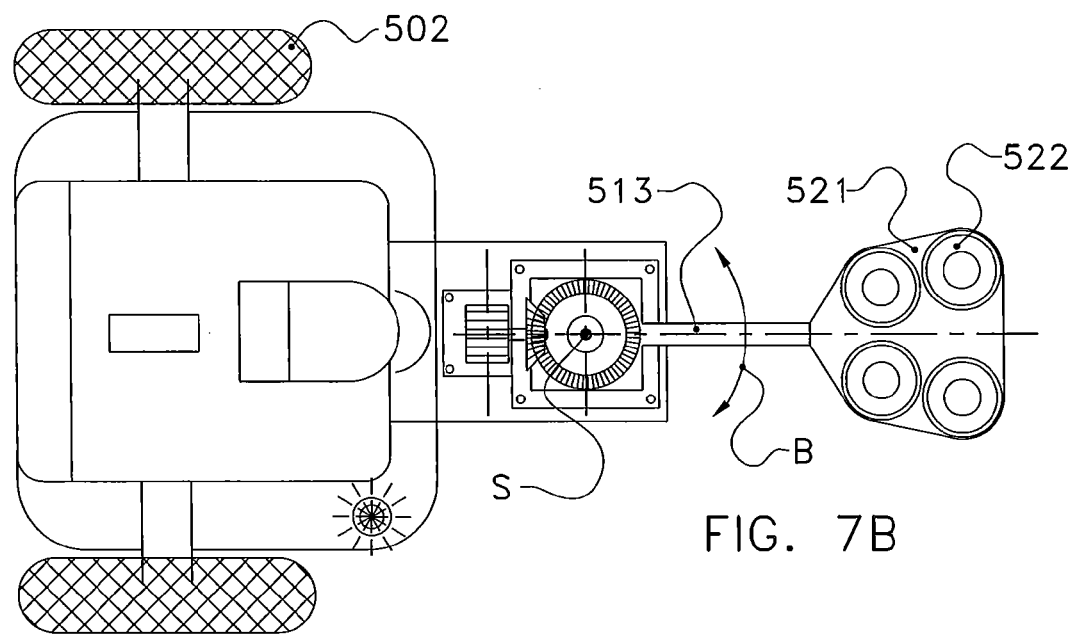

FIGS. 7A and 7B show another embodiment, with a robot carriage 500 which substantially corresponds to carriage 400, and in which corresponding components have the same reference numerals, increased by 100.

The distal end of the arm 513 is now provided with a carrier 521 on which four teat cups 522 are supported.

Figure 7C:
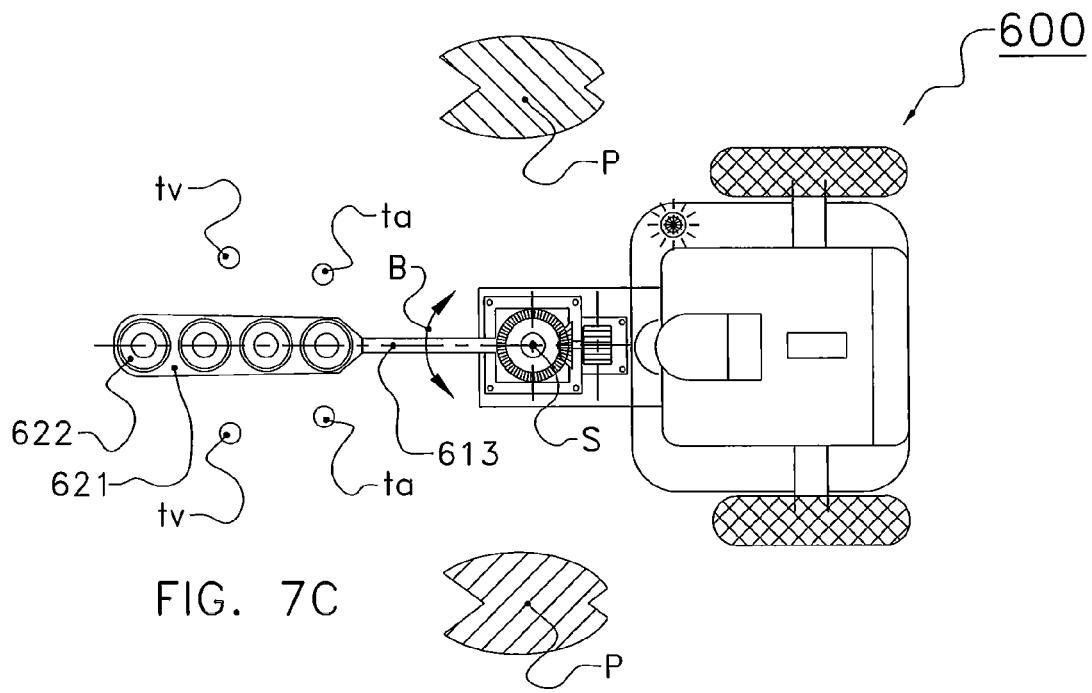
FIGS. 7C and 7D are an operational detail of the carriage according to FIG. 6A,B or 7A,B, in alternative embodiments, and FIGS. 8A and 8B, respectively, are a schematic view of a teat cup assembly according to the invention and a schematic design of a milking device provided therewith.
Figure 7D:
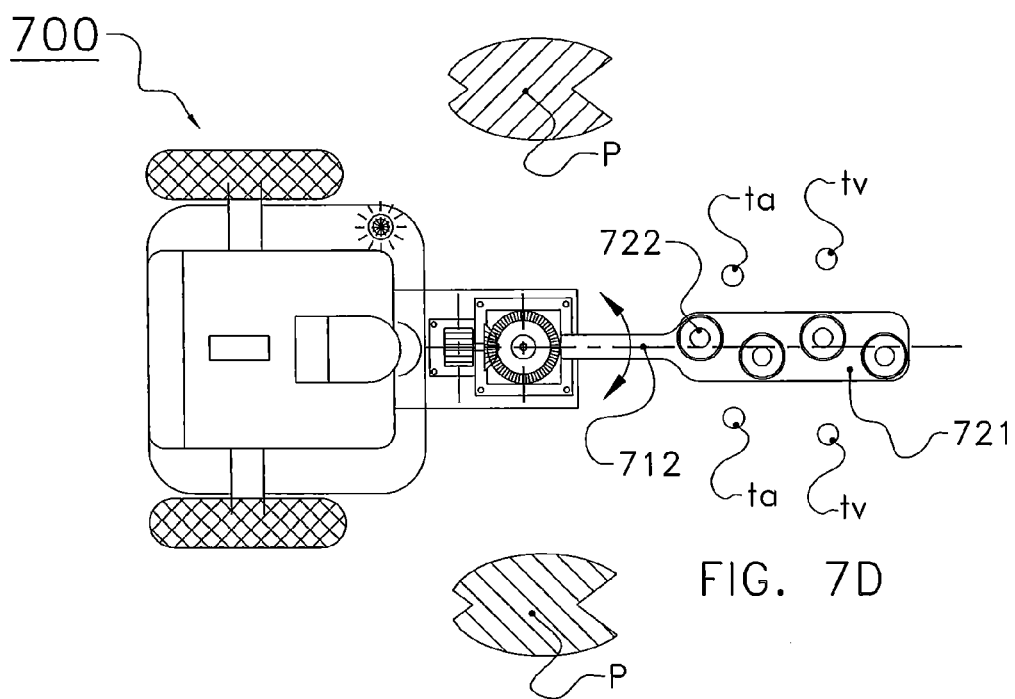

Other exemplary embodiments of the distal end of the arm 613 of the carriage 600, which arm is rotatable about the centre line S, are shown in FIG. 7C, in which the cups 622 on the holder 621 are all in line with each other, in the principal direction, longitudinal direction of the arm 613, wherein the cups in a plane of projection perpendicular to the principal direction, coincide completely, and in FIG. 7D, with a carriage 700 with again an arm 713 which is rotatable about centre line S, in which the cups 722 on the holder 721 are located behind each other in a line coinciding with the principal direction of the arm 713, in this case in a somewhat staggered position with respect to each other, so that, in the aforementioned plane of projection perpendicular to the principal direction, they coincide partly (approximately half). In both embodiments, the space occupied in transverse direction of the arm is limited, as a result of which supplying the cups between the hind legs P of a cow onto the arm and putting, if desired, said cups back on the arm is facilitated, as illustrated in FIG. 7C. The teats are denoted by ta (rear teats) and tv (front teats).

Applying teat cups or using other equipment for performing actions on the teats can be performed in a quick and controlled manner by means of a carriage according to the invention. The carriage can, for example, pick up the cups from a fixed holder on which a plurality of sets of cups are kept stand-by, or always be intended itself for the same set of cups, in which case the carriage carries the cups itself. In multiple milking devices a plurality of such carriages will be used, for example for every function and/or for every set of standing areas. The carriages are controlled by the central control unit to move the arm from behind between the hind legs of a cow standing in a standing area, until the arm has been moved so far that the centre line S has come between the legs P or somewhat in front thereof (under the udder). In this case, the widest part of the carriage can remain behind the legs P at some distance therefrom. By means of the position determining means 404,504 the position of a teat is determined, whereafter the motor 415,515 is controlled to move a cup 422,522 under said teat, if desired while moving the carriage forwards or rearwards to some extent.

As shown in FIGS. 1C, 7C and 7D, the point of rotation about centre line S is situated at the side of the teats t where the intersection of the two lines through each pair of a front teat tv and a rear teat ta lies, which limits the required pivotal movements of the arm on which the teat cups are held.

Figure 8A:
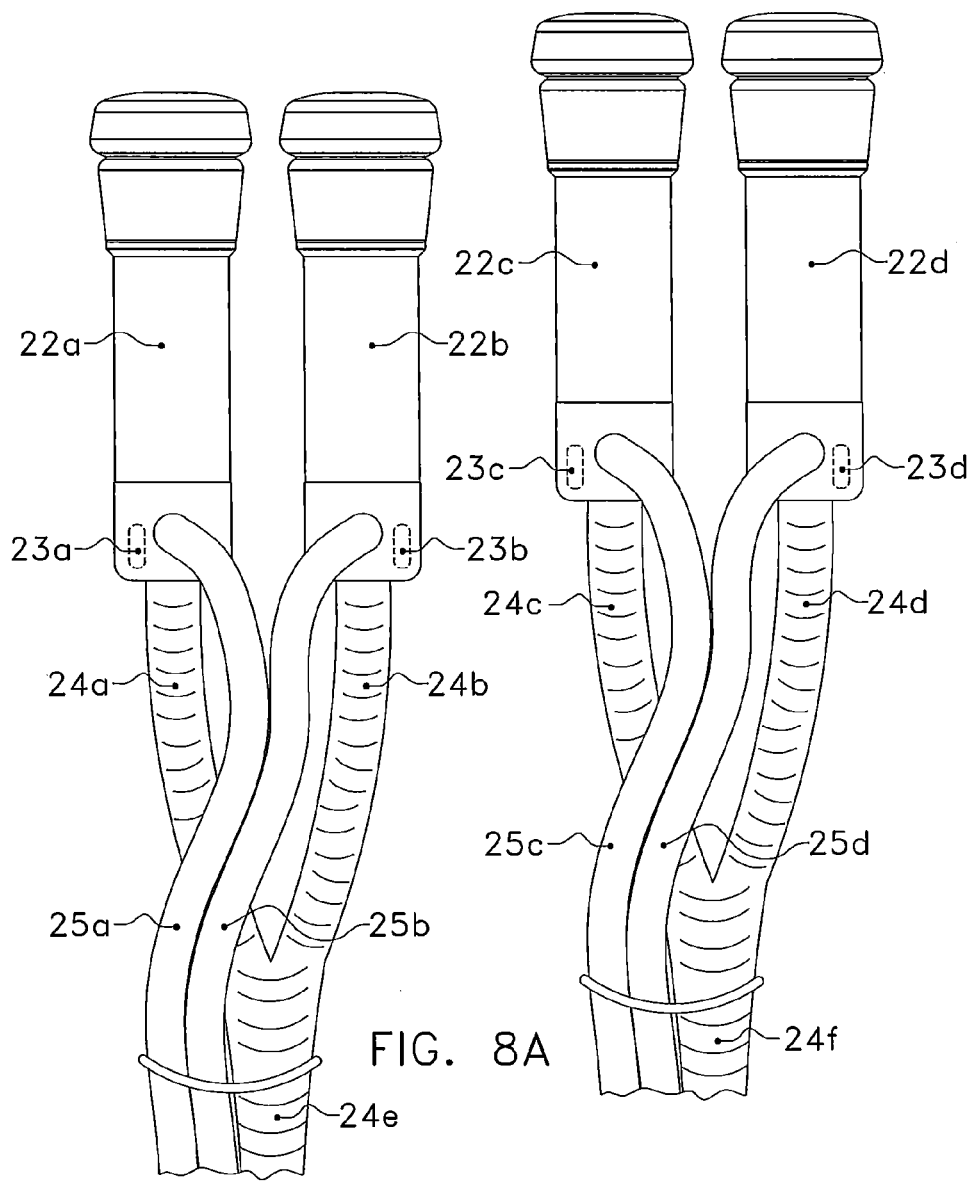
Figure 8B:
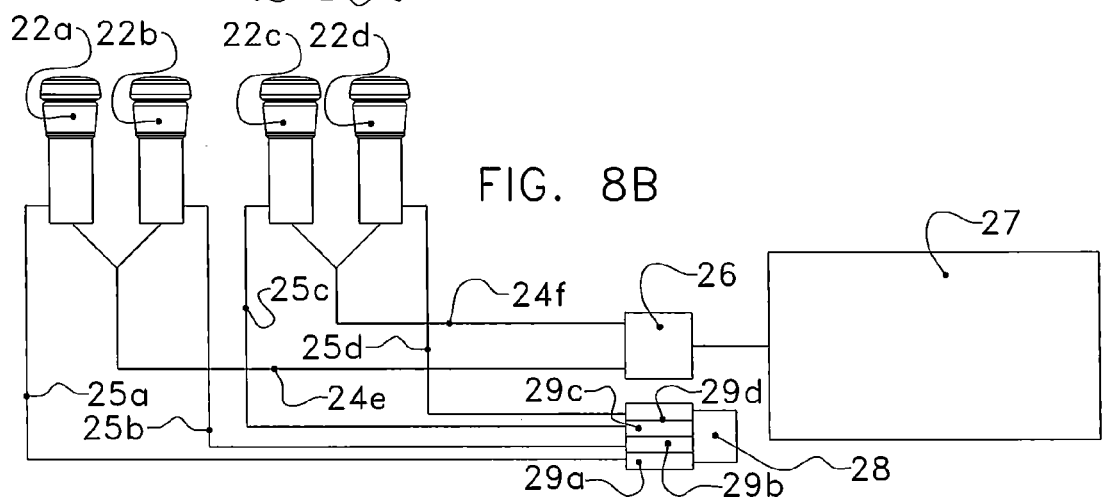

FIGS. 8A and 8B show two pairs of teat cups 22$a,b$ and 22$c,d$, intended for the two front teats and the two rear teats, respectively. The cups 22$a$-$d$ are provided with a milk discharge line 24$a,b,c,d$, respectively, and with an air duct 25$a,b,c,d$ leading to a source, by means of which a pulsating movement can be applied to a liner in the relevant cups, usually by means of alternately applying an (ambient) pressure and a vacuum from a vacuum source to the space around the liner.

The milk discharge lines 24$a$ and 24$b$ merge, at a short distance from the teat cup, for example at a distance in the order of the height of a teat cup, into a common discharge line 24$e$. In a comparable manner, the discharge lines 24$c$ and 24$d$ continue in a common discharge line 24$f$. The two associated air ducts 25$a,b$ and 25$c,d$ may be connected by, for example, a tie-wrap, to the discharge lines 24$e,f$.

At the beginning of the discharge lines 24$a,b,c,d$, there are provided flow meters 23$a,b,c,d$, which via not shown guide means, supply measurement signals to a programmable control unit 28. A threshold value for the milk flow taken from a teat can be input into the control unit 28.

The scheme of FIG. 8B illustrates that the discharge lines 24$e$ and 24$f$ debouch into a milk jar 26 which, itself, discharges by means of a single line to a cooled storage tank 27. There is further provided a non-shown discharge for foremilk. The air ducts 25$a,b,c,d$ are in connection with switch valves 29$a,b,c,d$. The switch valves 29$a,b,c,d$ are controlled by the control unit 28 and are in connection with a non-shown vacuum source.

In use, after the teat cups 24$a$-$d$ have been applied to the teats, the control unit 28 controls the switch valves 29$a,b,c,d$ in the customary manner to have the liners perform a pulsating movement, after the relevant teat cup has been attached to the teat. First, foremilk will flow from the teats and subsequently the milk flow will start. The flow from each cup is measured and compared in the control unit with the input threshold value. When the threshold value has not yet been reached, it can be assumed that the milk flow for the relevant teat has not yet started. Only when the threshold value for the flow of each of the two cups 22$a,b$ or 22$c,d$ has been obtained, the control unit will control the switch valve in question to apply vacuum in an alternating manner to the duct 25$a$ and the duct 25$b$. The same holds for the ducts 25$c$ and 25$d$. As a result thereof, in the common line 24$e$, the milk pulses from cup 22$a$ flow before or after the milk pulses from cup 22$b$. This means that the total milk flow is better distributed in direction of flow, so that for the same total flow a smaller passage can suffice, in which case the internal cross-section of line 24$e$ can be equal to that of line 24$a$ or 24$b$.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for milking an animal, the device comprising:
an animal standing area to be occupied by the animal to be milked in a particular milking position, and
a robot device with a robot arm assembly for at least one of applying to and removing teat cups from respective teats of an udder of the animal, wherein the robot arm assembly comprises:
a distal end, wherein at the distal end the assembly comprises a holder for the teat cups, and
a proximal end, wherein at the proximal end the assembly is suspended from a support so as to extend downwards therefrom,
the assembly is further rotatable with respect thereto about a first centre line which has a vertical direction component, wherein the first centre line is configured to intersect the floor of the animal standing area, and wherein the first centre line makes an angle of less than 30 degrees with the vertical.

2. The device according to claim 1, wherein, in use, during milking, the first centre line intersects the floor of the animal standing area at a place situated in the vertical projection of the animal on the floor in the position occupied by the animal.

3. The device according to claim 1, wherein the animal standing area comprises a rear region which, in use, is configured to comprise a region beginning with the navel of the animal and the animal part located therebehind when the animal standing area is occupied by the animal, wherein the robot arm assembly has an end arm portion which comprises the distal end, wherein the first centre line intersects the end arm portion at a place above the rear region.

4. The device according to claim 3, wherein the rear region has a rear part for the hind legs and the udder region of the animal, wherein the first centre line intersects the end arm portion at a place above the rear part of the rear region.

5. The device according to claim 4, wherein the rear part of the rear region has a hind leg part for the hind legs of the animal, wherein the first centre line intersects the end arm portion at a place above the hind leg part of the rear part of the rear region.

6. The device according to claim 5, wherein the first centre line intersects the end arm portion at a place between the hind legs.

7. The device according to claim 3, wherein the first centre line intersects the end arm portion in a region under the animal, the region comprising at least one of: a region located between the rear side of the hind legs and the front teats, a region located between the rear side of the hind legs and the rear teats of the udder of the animal, and a place between the hind legs.

8. The device according to claim 1, wherein the position of the support for the robot arm assembly is constructively determined.

9. The device according to claim 1, wherein the animal standing area is elongate and the first centre line, in use, is located in a vertical plane which is parallel to a vertical central longitudinal plane of the animal standing area.

10. The device according to claim 1, further comprising a frame for supporting the support, wherein the support is located at a distance above the floor of the animal standing area, which distance is greater than the height of the teats of the animal to be milked.

11. The device according to claim 1, comprising a frame for supporting the support, wherein the support is located at a distance above the floor of the animal standing area, wherein the distance of the support located above the floor is greater than a height of the animal to be milked.

12. The device according to claim 1, wherein the first centre line extends substantially vertically.

13. The device according to claim 1, wherein the robot arm assembly in the proximal end is rotatable about a substantially horizontal second centre line which is transverse to the first centre line.

14. The device according to claim 13, wherein the second centre line is perpendicular to the first centre line.

15. The device according to claim 1, wherein the robot arm assembly comprises a gripper for holding equipment extend from the rear side to under the animal.

16. A shed provided with one or more of the devices of claim 1.

17. A device for milking an animal comprising an elongate animal standing area, with a rear end and a front end, for bringing the animal to be milked into a particular milking position and a robot device with a robot arm assembly for performing actions on the teats of the animal to be milked, wherein the robot arm assembly at a distal end is provided with a gripper for holding equipment with which is configured to perform actions, wherein the robot arm assembly at a proximal end is suspended from a support and is rotatable with respect thereto about a first centre line which has a vertical direction component, as well as about a substantially horizontal second centre line which is transverse, to the first centre line, further provided with drive for bringing the holder at the rear end, between the hind legs of an animal standing in the animal standing area, to near the udder.

18. The device according to claim 17, wherein the second centre line is perpendicular to the first centre line.

19. The device according to claim 17, wherein, in use, the first centre line intersects the floor of the animal standing area.

20. The device according to claim 17, wherein the support is provided with a first drive for rotating the robot arm assembly about the first centre line.

21. The device according to claim 20, wherein the support is provided with a second drive for rotating the robot arm assembly about the second centre line.

22. The device according to claim 21, wherein the robot arm assembly, at a place between the distal end and the proximal end, is provided with a pivot with a substantially horizontal centre line, wherein the drive for a third drive for the movement about said pivot is mounted in the support.

23. The device according to claim 17, wherein the holder is configured to at least one of apply and remove teat cups from respective teats of the udder of the animal, wherein the holder is configured to hold teat cups and are provided at the distal end of the robot arm assembly.

24. The device according to claim 23, wherein the teat cups are configured for at least one of cleaning and disinfecting the teats at least one of prior to milking, foremilking, milking, and following the milking.

25. The device according to claim 17, further provided with a separate carrier for teat cups, wherein the holder at the distal end of the robot arm assembly is configured to take the teat cups from the carrier and to put the teat cups back on the carrier.

26. The device according to claim 17, wherein the holder is configured to hold at least one of the teats and the udder for cleaning.

27. The device according to claim 18, wherein the holder is configured to hold a mechanism for at least one of inspecting the milk quality and stimulating the teats.

28. The device according to claim 17, provided with a series of juxtaposed animal standing areas, wherein the series is one of straight or circumferential.

29. A shed provided with one or more of the devices of claim 17.

30. A method of performing a milking related action on teats of an animal standing in an animal standing area, wherein the action is performed by equipment mounted on a distal end of a robot arm assembly and, extending with a horizontal direction component, is passed from behind between hind legs of the animal to near the teats, whereafter the actions are performed in succession for at least two teats while pivoting the robot arm assembly with the equipment about a first centre line with a vertical direction component which intersects the floor of the animal standing area, and wherein the first centre line makes an angle of less than 30 degrees with the vertical.

31. The method according to claim 30, wherein the actions are performed in succession for at least one of: two front teats, two rear teats and all teats.

32. The method according to claim 30, wherein the animal standing area comprises a rear region which, in use, is configured for a region beginning with the navel of the animal and the animal part located therebehind, wherein the robot arm assembly has an end arm portion which comprises the distal end and extends between the hind legs, wherein, during performing the actions, the first centre line intersects the end arm portion at a place above the rear region.

33. The method according to claim 30, wherein the rear region has a rear part for the hind legs and the udder region of the animal, wherein, during performing the actions with the equipment, the first centre line intersects the end arm portion at a place above the rear part of the rear region.

34. The method according to claim 30, wherein the rear part of the rear region has a hind leg part for the hind legs of the animal, wherein, during performing the actions with the equipment, the first centre line intersects the end arm portion at a place above the hind leg part of the rear part of the rear region.

35. The method according to claim 34, wherein the first centre line intersects at a place between the hind legs.

36. The method according to claim 30, wherein, during performing the actions, the first centre line intersects the end arm portion in at least one of: a region under the animal, a region located between the rear side of the hind legs and the front teats, a region located between the rear side of the hind legs and the rear teats of the udder of the animal, and at a place between the hind legs.

37. The method according to claim 30, wherein, during the actions, the robot arm assembly is positioned such that the first centre line coincides with a vertical central longitudinal plane of the animal.

38. The method according to claim 30, wherein, during performing the actions with the equipment, the robot arm assembly is downwardly suspended from a support.

39. The method according to claim 30, wherein, during performing the actions with a tool, the robot arm assembly extends with a horizontal direction component from a support which is directly supported on a ground, wherein the tool is rotatable about the first centre line in the region of a pivot which is kept below the trunk of the animal.

40. The method according to claim 39, wherein the support is formed by a self-propelled carriage.

41. The method according to claim 40, wherein the carriage is freely movable.

42. The method according to claim 30, wherein the action relates to at least one of applying teat cups to udders of the animal, removing teat cups from respective teats of the udder of the animal, cleaning the teats prior to milking, cleaning the teats after milking, disinfecting the teats prior to milking, disinfecting the teats after milking, milking, and stimulating the teats.

43. The method according to claim 30, wherein successive sorts of actions are each performed with a separate robot arm assembly equipped accordingly.

44. A method of performing a milking related action on the teats of an animal standing in an animal standing area, wherein the action is performed with equipment which is mounted on an arm assembly of a robot, which robot arm assembly is suspended from a support and extends downwards therefrom, wherein the position of the support is always mechanically controlled, wherein the actions are performed while pivoting the robot arm assembly with respect to the support about a first centre line which intersects the floor of the animal standing area and wherein the first centre line makes an angle of less than 30 degrees with the vertical.

45. A method according to claim 44, wherein, during pivoting for performing the aforementioned actions, the first centre line intersects the floor of the animal standing area at a place situated in the momentary vertical projection of the animal on the floor.

46. A method of performing a milking related action on the teats of an animal standing in an animal standing area, wherein the action is performed with equipment which is mounted on a robot arm, wherein the actions are performed in succession for at least two teats while pivoting the arm with the equipment, the arm extending with a horizontal direction component, about a first centre line with a vertical direction component which intersects the robot arm at a place above the part of the floor of the standing area that is intended to be positioned below the udder or under or between the hind legs of the animal, and wherein the first centre line makes an angle of less than 30 degrees with the vertical.

47. A method according to claim 46, wherein the robot arm is passed from behind between the hind legs of the animal to near the teats, whereafter the actions are performed in succession for at least two teats while pivoting the arm with the equipment about the first centre line.

48. A carriage provided with a drive and a control unit for freely moving the carriage over a ground, wherein the carriage is provided with an arm extending with a horizontal direction component, wherein the arm further comprises a holder for holding equipment for performing an action on the teats of an animal which is to be milked or has been milked in an animal standing area, wherein the holder is mounted on a distal end portion of the arm, wherein the arm is connected to the carriage by a pivot, and the arm is rotatable with respect to the pivot about a pivot axis having a vertical direction component.

49. A carriage according to claim 48, comprising a chassis, wherein, viewed in vertical projection on a horizontal plane, the pivot is located either inside or outside the chassis.

50. A shed provided with one or more carriages according to claim 48.

51. An animal milking assembly, the assembly comprising an animal milking device and a holder for teatcup, wherein the animal milking device comprises:
    an animal standing area to be occupied by the animal to be milked in a particular milking position, and
    a robot device with a robot arm assembly for at least one of applying to and removing teat cups from respective teats of an udder of the animal, wherein the robot arm assembly comprises:
    a distal end, wherein at the distal end the assembly comprises a holder for the teat cups, and
    a proximal end, wherein at the proximal end the assembly is suspended from a support so as to extend downwards therefrom, and
    the holder for the teat cups further comprises: a movable arm which is provided at its end with a carrier with receivers for at least two teat cups, wherein the arm has a principal direction and the receivers, viewed in the principal direction, are located behind each other according to one line coinciding with or parallel to the principal direction, wherein, in a projection on a plane perpendicular to the principal direction, they coincide at least partly, and
    wherein the assembly is further rotatable with respect thereto about a first centre line which has a vertical direction component, wherein the first centre line is configured to intersect the floor of the animal standing area, and wherein the first centre line makes an angle of less than 30 degrees with the vertical.

* * * * *